United States Patent [19]

King

[11] Patent Number: 5,043,890
[45] Date of Patent: Aug. 27, 1991

[54] COMPENSATION OF COMPUTED TOMOGRAPHY DATA FOR OBJECTS POSITIONED OUTSIDE THE FIELD OF VIEW OF THE RECONSTRUCTED IMAGE

[75] Inventor: Kevin F. King, New Berlin, Wis.

[73] Assignee: General Electric, Milwaukee, Wis.

[21] Appl. No.: 364,958

[22] Filed: Jun. 12, 1989

[51] Int. Cl.$^5$ .............................................. G06F 15/42
[52] U.S. Cl. ........................ 364/413.21; 364/413.19; 364/413.18
[58] Field of Search ...................... 364/413.21, 413.18, 364/413.19, 413.15; 250/363.04

[56] References Cited

U.S. PATENT DOCUMENTS

| 4,305,127 | 12/1981 | Heuscher | 364/413.18 |
| 4,550,371 | 10/1985 | Glover et al. | 364/413.21 |
| 4,606,004 | 8/1986 | Crawford et al. | 364/413.21 |
| 4,633,398 | 12/1986 | Gullberg et al. | 364/413.21 |
| 4,692,624 | 9/1987 | Ichihara | 250/363.04 |
| 4,878,169 | 10/1989 | Toner et al. | 364/413.19 |

FOREIGN PATENT DOCUMENTS

| 0107253 | 5/1984 | European Pat. Off. . |
| 0242909 | 10/1987 | European Pat. Off. . |
| 2006566 | 5/1979 | United Kingdom . |

OTHER PUBLICATIONS

Nalcioglu et al., "Limited Field of View Reconstruction in Computed Tomography", Dept. of Rad. Sci., Univ. of Calif., IEEE Trans. on Nuc. Sci., vol. NS-26, No. 1, Feb. 1979.

Primary Examiner—Jerry Smith
Assistant Examiner—Russell E. Cass
Attorney, Agent, or Firm—Quarles & Brady

[57] ABSTRACT

An x-ray CT system acquires attenuation data over a field of view which is larger than the field of view of the reconstructed image. The data used to reconstruct the image is compensated for the shading effects otherwise caused by objects outside the image, but within the x-ray path. This compensation is accomplished with minimal impact on computation time by using a first order estimation of the convolution of the acquired attenuation data outside the image field of view.

3 Claims, 6 Drawing Sheets ized for storage in a computer memory. These steps are referred to in the art collectively as "preprocessing" and they are performed in real time as the data is being acquired. The acquired transmission profiles are then used to reconstruct an image which indicates the x-ray attenuation coefficient of each voxel in the reconstruction field of view. These attenuation coefficients are converted to integers called "CT numbers", which are used to control the brightness of a corresponding pixel on a CRT display. An image which reveals the anatomical structures in a slice taken through the patient is thus produced.

COMPENSATION OF COMPUTED TOMOGRAPHY DATA FOR OBJECTS POSITIONED OUTSIDE THE FIELD OF VIEW OF THE RECONSTRUCTED IMAGE

BACKGROUND OF THE INVENTION

The field of the present invention is computed tomography and, particularly, computer tomography (CT) scanners used to produce medical images from x-ray attenuation measurements.

As shown in FIG. 1, a CT scanner used to produce images of the human anatomy includes a patient table 10 which can be positioned within the aperture 11 of a gantry 12. A source of highly columinated x-rays 13 is mounted within the gantry 12 to one side of its aperture 11, and one or more detectors 14 are mounted to the other side of the aperture. The x-ray source 13 and detectors 14 are revolved about the aperture 11 during a scan of the patient to obtain x-ray attenuation measurements from many different angles through a range of at least 180° of revolution.

A complete scan of the patient is comprised of a set of x-ray attenuation measurements which are made at discrete angular orientations of the x-ray source 13 and detector 14. Each such set of measurements is referred to in the art as a "view" and the results of each such set of measurements is a transmission profile. As shown in FIG. 2A, the set of measurements in each view may be obtained by simultaneously translating the x-ray source 13 and detector 14 across the acquisition field of view, as indicated by arrows 15. As the devices 13 and 14 are translated, a series of x-ray attenuation measurements are made through the patient and the resulting set of data provides a transmission profile at one angular orientation. The angular orientation of the devices 13 and 14 is then changed (for example, 1°) and another view is acquired. An alternative structure for acquiring each transmission profile is shown in FIG. 2B. In this construction, the x-ray source 13 produces a fan-shaped beam which passes through the patient and impinges on an array of detectors 14. Each detector 14 in this array produces a separate attenuation signal and the signals from all the detectors 14 are separately acquired to produce the transmission profile for the indicated angular orientation. As in the first structure, the x-ray source 13 and detector array 14 are then revolved to a different angular orientation and the next transmission profile is acquired.

As the data is acquired for each transmission profile, the signals are filtered, corrected and digitized for storage in a computer memory. These steps are referred to in the art collectively as "preprocessing" and they are performed in real time as the data is being acquired. The acquired transmission profiles are then used to reconstruct an image which indicates the x-ray attenuation coefficient of each voxel in the reconstruction field of view. These attenuation coefficients are converted to integers called "CT numbers", which are used to control the brightness of a corresponding pixel on a CRT display. An image which reveals the anatomical structures in a slice taken through the patient is thus produced.

The reconstruction of an image from the stored transmission profiles requires considerable computation and cannot be accomplished in real time. The prevailing method for reconstructing images is referred to in the art as the filtered back projection technique, and the calculating time required when using this technique is determined in part by the amount of attenuation data acquired during each view, or transmission profile. In particular, the filtering step in this technique is carried out using a Fourier transformation, and the calculating time for this transformation can be affected dramatically with a change in the amount of acquired transmission profile data.

Referring to FIG. 3, the proper reconstruction of an image requires that the x-ray attenuation values in each view pass through all of the objects located in the aperture 11. If the object is larger than the acquired field of view, it will attenuate the values in some transmission profiles as shown by the vertically oriented view in FIG. 3, which encompasses the supporting table 10, and it will not attenuate the values in other transmission profiles as shown by the horizontally oriented view in FIG. 3. As a result, when all of the transmission profiles are back projected to determine the CT number of each voxel in the reconstructed field of view, the CT numbers will not be accurate. This inaccuracy can be seen in the displayed image as background shading which can increase the brightness or darkness sufficiently to obscure anatomical details.

The solution to this problem, of course, is to insure that the entire object in the aperture 11 is within the field of view of the acquired data. For example, when imaging the patient's head, a head holder 15 such as that disclosed in U.S. Pat. No. 4,400,820 is employed and extends from the end of the table 10 and closely follows the contour of the head. The head holder 15 supports the patient, but does not significantly increase the size of the field of view required to encompass it from all angles.

Unfortunately, there are many instances in which it is not possible to confine all objects to the field of view. For example, it may not be possible to use the head holder on trauma patients, in which case, the table 10 must be employed for support and will reside in the aperture 11. In such cases, either the consequent degradation of image quality must be accepted, or the field of view of the acquired data used in making the reconstructed image must be expanded with the consequent increase in computation time.

SUMMARY OF THE INVENTION

The present invention relates to a technique for compensating transmission profile data which is used to reconstruct an image, and more particularly, for altering the transmission profile data to offset the effects of objects outside the reconstruction field of view. The method includes: acquiring transmission profile data from a field of view which includes the objects outside the reconstruction field of view; filtering the transmission profile data by convoluting the central transmission profile data which resides within the reconstruction field of view with a convolution kernel; separately convoluting the peripheral transmission profile data which lies outside the reconstruction field of view with the convolution kernel; compensating the filtered transmission profile data by adding the filtered peripheral transmission profile data to the filtered central transmission profile data; and reconstructing an image using the compensated, filtered transmission profile data.

A general object of the invention is to compensate CT data for objects outside the view of the reconstructed image without significantly increasing the computation time of the image reconstruction. The field of view of the data acquisition is increased as necessary to include all of the objects. The resulting transmission profiles include a central region which contains the attenuation values needed for the image reconstruction, and peripheral regions which contain attenuation values outside the field of view of the reconstructed image. The central region is filtered in the conventional manner using the desired convolution kernel and the peripheral regions are filtered separately using the same convolution kernel, but with a simplified procedure which avoids the use of time consuming Fourier transformations. The filtered central region data is then compensated with the filtered peripheral region data to offset the effects of objects outside the field of view of the reconstructed image. While the computation time is increased, the increase is only a fraction of that required to filter the entire transmission profile in the conventional manner.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
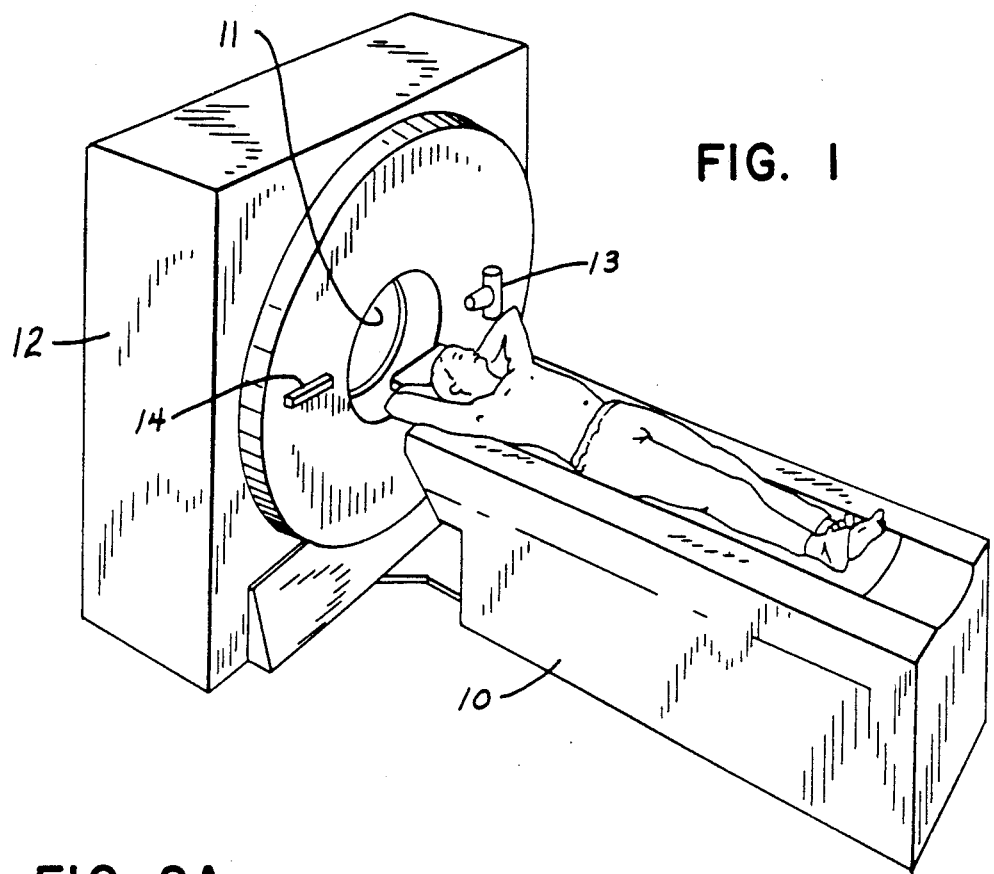
FIG. 1 is a perspective view of a CT system in which the present invention may be employed.
Figure 2A:
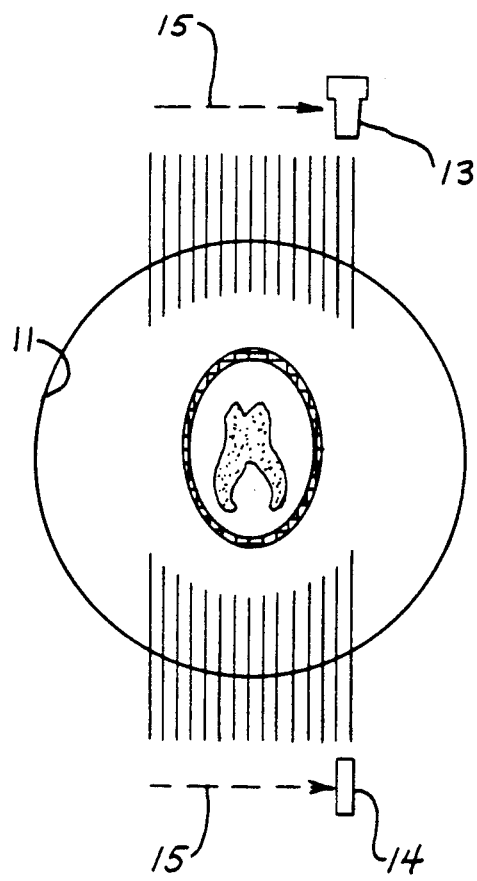
FIGS. 2A and 2B are schematic representations of two types of scanning techniques which may be employed in the CT system of FIG. 1.
Figure 2B:
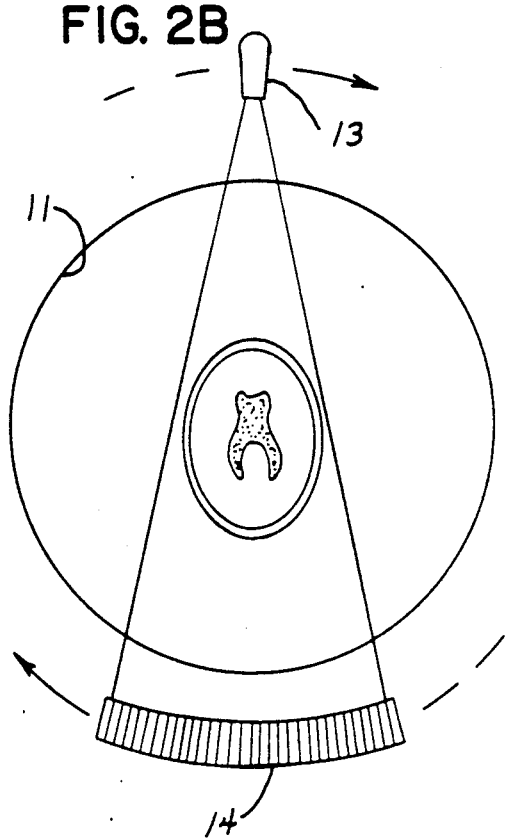
Figure 3:
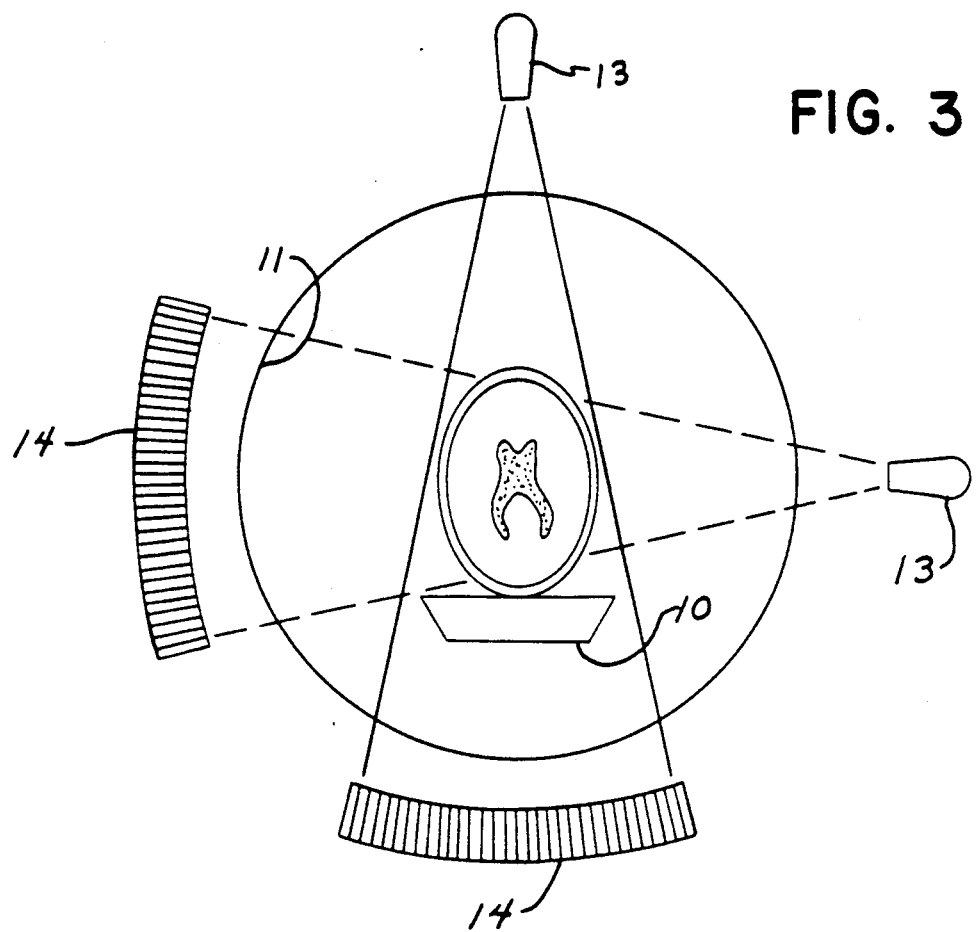
FIG. 3 is a schematic representation of the scanning technique of FIG. 2B showing the problem created by objects which are outside the field of view.
Figure 4:
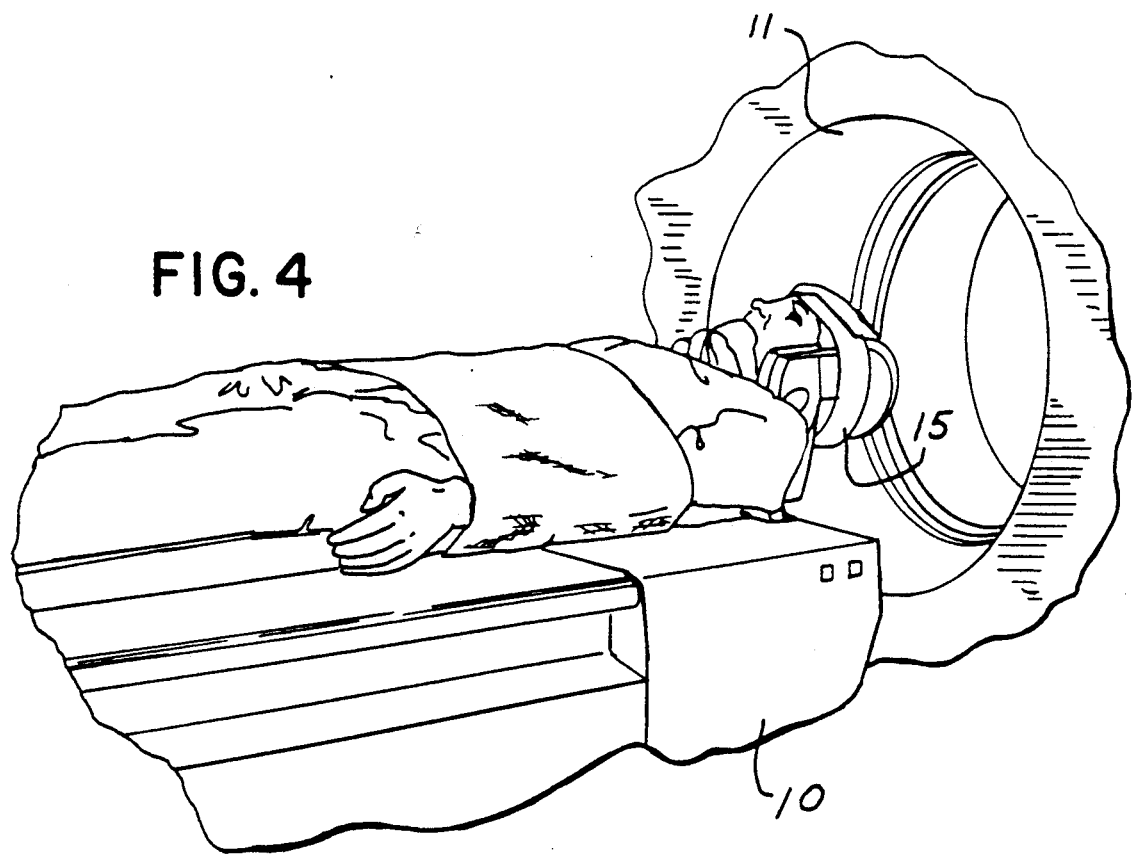
FIG. 4 is a partial pictorial view of a patient in the CT system of FIG. 1.
Figure 5:
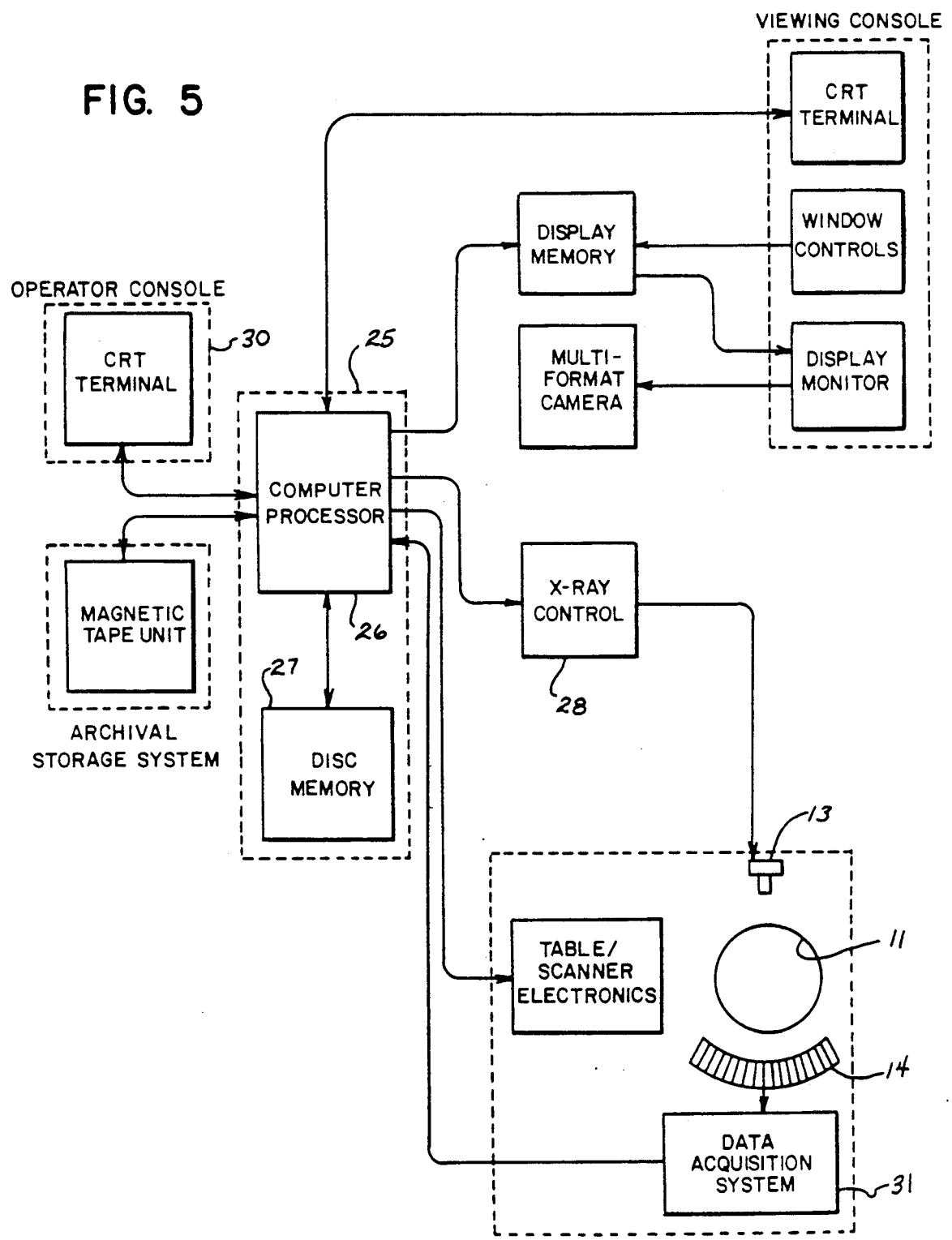
FIG. 5 is a block diagram of the CT system of FIG. 1.

Referring particularly to FIG. 5, the operation of the CT system is controlled by a programmed data processing system 25 which includes a computer processor 26 and a disc memory 27. The disc memory 27 stores the programs the computer processor 26 uses in patient scanning and in image reconstruction and display. It also stores on a short-term basis the acquired data and the reconstructed image data. The computer processor includes a general purpose minicomputer with input and output ports suitable for connection to the other system elements as shown. It also includes an array processor such as that disclosed in U.S. Pat. No. 4,494,141.

An output port on the computer processor 26 connects to an x-ray control circuit 28, which in turn controls the x-ray tube 13. The high voltage on the x-ray tube 13 is controlled and its cathode current is controlled to provide the correct dosage. The high voltage and cathode current are selected by an operator who enters the desired values through an operator console 30 and the computer processor 26 directs the production of the x-rays in accordance with its scan program.

The x-rays are dispersed in a fan-shape as described above and received by the array of detectors 14 mounted on the opposite side of the gantry aperture 11. There are 852 individual cells, or detector elements, and each examines a single ray originating from the x-ray tube 13 and traversing a straight line path through a patient located in the aperture 11. The detector array 14 also includes a group of reference cells at each of its ends that receive unattenuated x-rays from the source 13. The currents formed in each detector element are collected as an analog electrical signal and converted into a digital number by A/D converters in a data acquisition system 31. The signals are digitized sequentially starting at the first detector and ending with the 852nd detector. The digitized measurements from all the detectors is a complete view. U.S. Pat. Nos. 4,112,303 and 4,115,695 disclose details of the gantry construction, U.S. Pat. No. 4,707,607 discloses the details of the detector array 14, and the data acquisition system is disclosed in U.S. Pat. No. 4,583,240. The digitized signals are input to the computer processor 26.

Figure 6:
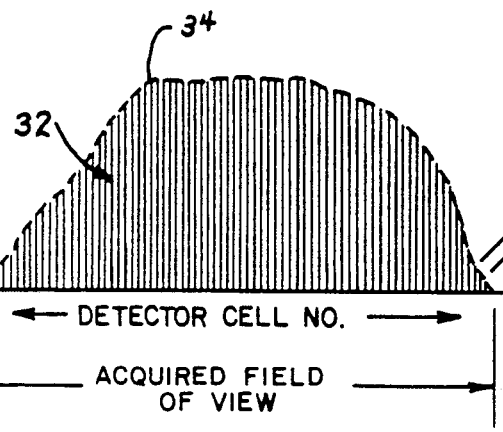
FIG. 6 is a pictorial representation of the data which is acquired and processed by the CT system of FIG. 1.
Figure 6:
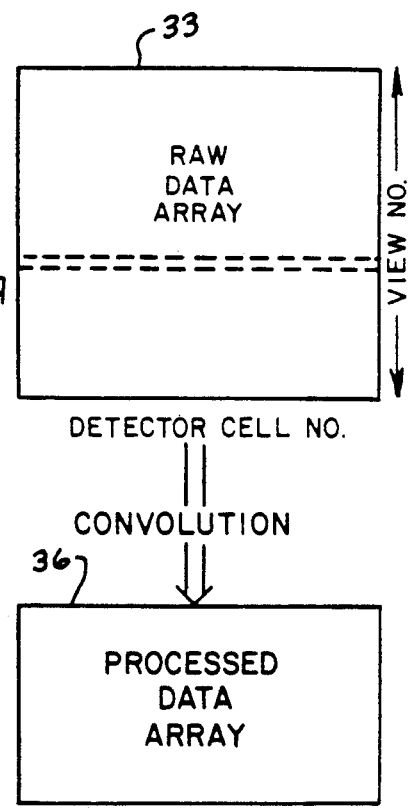

The digitized attenuation measurements from the data acquisition system 31 are preprocessed in a well known manner to compensate for "dark currents", for uneven detector cell sensitivities and gains, and for variations in x-ray beam intensity throughout the scan. This is followed by beam hardening corrections and conversion of the data to logarithmic form so that each measured value represents a line integral of the x-ray beam attenuation. This preprocessing is performed in real time as the scan is being conducted and, as shown in FIG. 6, the attenuation values 32 in each view are stored on one row of a two-dimensional raw data array 33. As indicated by the dashed line 34, each such row of attenuation data provides a transmission profile of the object to be imaged when viewed from a single angle.

At the completion of the scan, the raw data array 33 stores on each of its rows a transmission profile 34 from one view. One dimension of this array 33 is, therefore, determined by the number of views which are acquired in the scan and the other dimension is determined by the number of detector cell signals which are acquired during each view. The number of detector cell signals which are acquired determine the acquired field of view, and in accordance with the present invention, this field of view should be large enough to include all objects within the gantry aperture 11 that may distort the reconstructed image. In the preferred embodiment, this may include up to 852 detector cell signals.

Figure 7:
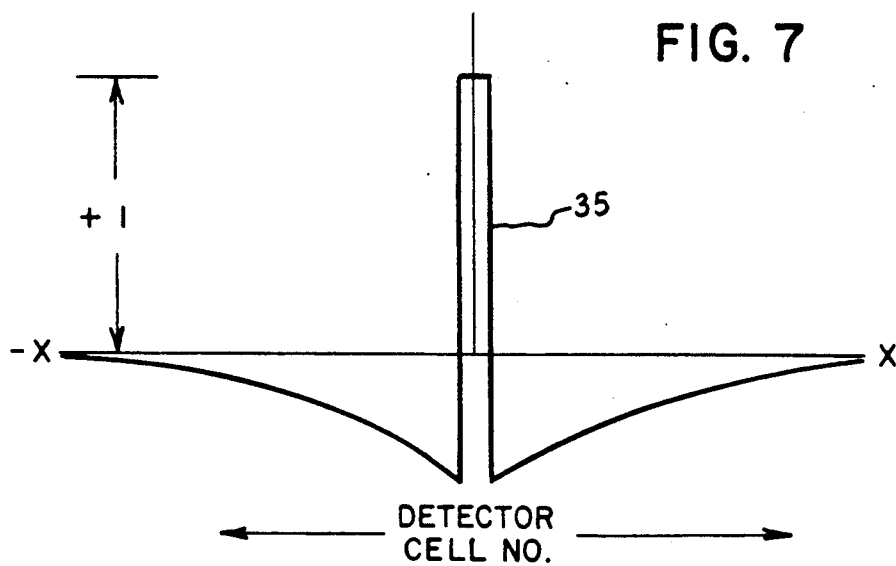
FIG. 7 is a graphic representation of a convolution kernel used to process the data of FIG. 6.

Before reconstructing an image from the attenuation values in the raw data array 33, the data is filtered, or modified, by a convolution kernel 35 as illustrated in FIG. 7. As is well known in the art, the convolution with kernel 35 modifies the attenuation data such that when each transmission profile is subsequently back projected to reconstruct the image, blurring around each point is eliminated. The convolution kernel function $K(x)$ is symmetric about $x=0$ where it has a value of "1", and the values to either side are negative. This convolution step is very computationally intensive since it involves the multiplication of attenuation values around each element in the raw data array 33 by the values of the convolution kernel 35, and adding the results together to form a processed data array 36 shown in FIG. 6. The method commonly used to perform this function is to Fourier transform each row of the raw data array 33, Fourier transform the convolution kernel 35, and multiply the two transformed waveforms together. An inverse Fourier transformation is then performed to produce the processed data array 36.

The amount of processing required to perform this convolution step does not increase linearly as a function of the number of detector cell signals includes in the processed field of view. Instead, the time required to perform the convolution using the Fourier transformation method is approximately proportional to $N\log_2 N$, where N is the smallest power of two which is greater than or equal to the number of detector cell signals being processed. For example, if 512 or fewer detection cell signals are processed, then N=512. On the other hand, if 513 or more detector cell signals are processed, then N=1024 and the convolution processing time nearly doubles. In other words, if increasing the number of detector cell signals results in the crossing of a power-of-two boundary, the processing time nearly doubles.

The present invention is a method for processing transmission profile data having a wide acquired field of view without crossing a power-of-two boundary which drastically increases convolution processing time. The method is implemented by a program which is executed by the computer processor 26 to carry out the convolution process. The method will now be described with reference to the flow chart in FIG. 9 and the diagrams in FIGS. 8A-8D.

Figure 8A:
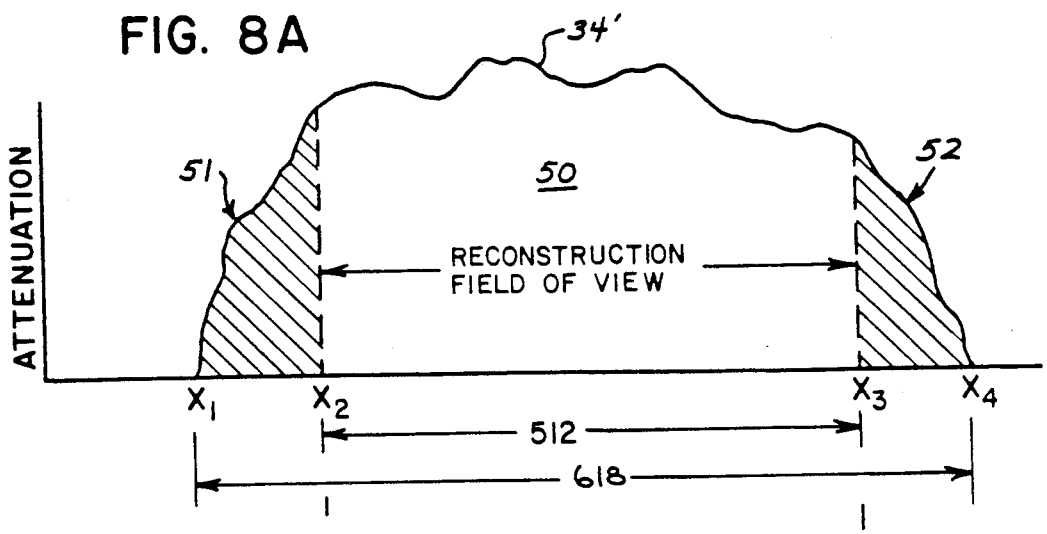
FIGS. 8A–8D are graphic representations of how the acquired data is processed according to the present invention.
Figure 8B:
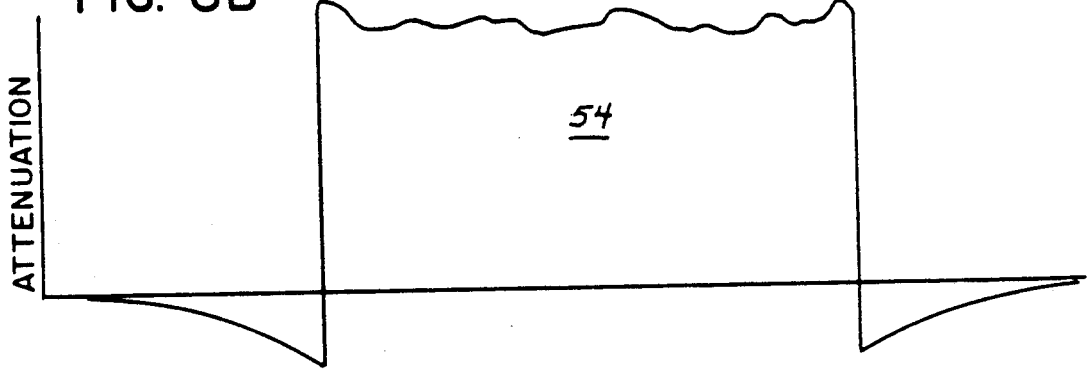
Figure 9:
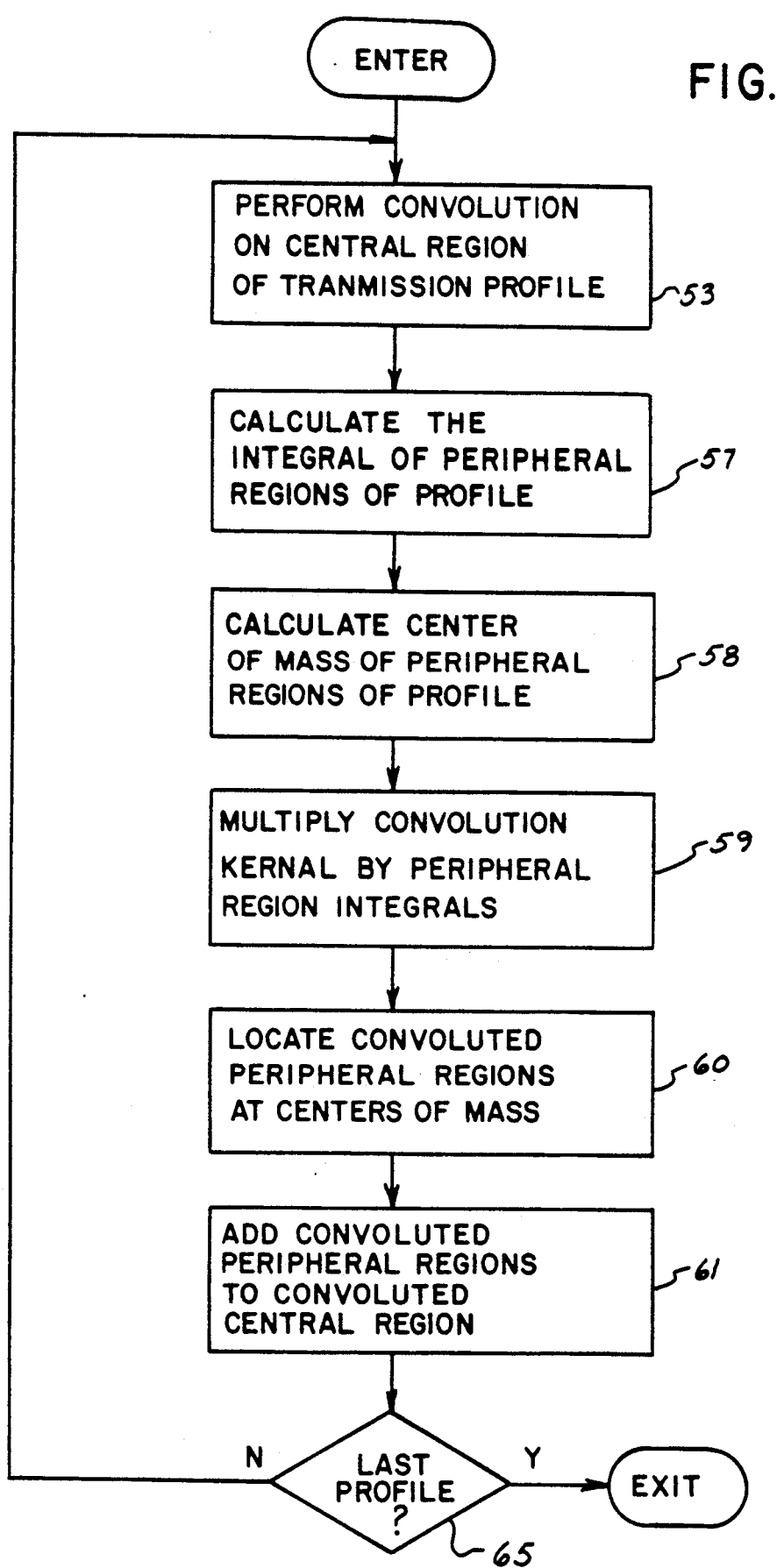
FIG. 9 is a flow chart of the convolution program which is executed by the CT system of FIG. 1 to carry out the present invention.

The convolution is performed on each row of data in the raw data array 33 (i.e. transmission profile), using the convolution kernel 35. As shown best in FIG. 8A, the acquired data produces a transmission profile having up to 618 separate elements, or attenuation values. These are divided into a central region 50 of 512 elements and two peripheral regions 51 and 52 of up to 53 elements each. As indicated by process block 53 in FIG. 9, the first step in the convolution process is to perform a conventional convolution of the 512 element central region 50 of the transmission profile. That is, a Fourier transform is performed on the central region 50, the transformed convolution is multiplied by the result, and an inverse Fourier transform is performed on the sum. The 512 element result is stored in the corresponding row of the processed data array 36 (FIG. 6) and a pictorial representation of this convoluted data 54 is shown in FIG. 8B. If this data is used to reconstruct an image, shading effects will be produced by the failure to consider the attenuation values contained in the peripheral regions 51 and 52. The remainder of the process is to correct the processed central region data 54 to account for the peripheral regions 51 and 52. Obviously, the convolution of the entire 618 element transmission profile could have been done in the conventional manner of process block 53, but a power-of-two boundary would have to be crossed as described above, and the processing time would nearly double.

Referring again to FIG. 8A, let $x_1$ and $x_2$ be the boundaries of the peripheral region 51 and $x_3$ and $x_4$ be the boundaries of the peripheral region 52. The attenuation data in the peripheral region 51 contributes a term to the convolution of the entire transmission profile at any point x as follows:

$$\int_{x_1}^{x_2} P(x')K(x-x')dx' \quad (1)$$

where:
  K(x) is the convolution kernel;
  P(x') is the transmission profile; and
  x' is a dummy variable which represents the point at which the product of the two functions are added together in the convolution process.

Expanding the convolution kernel $K(x-x')$ in a Taylor series about an arbitrary point $x_0$ gives:

$$K(x-x') = K(x-x_0) + (x_0-x') K'(x-x_0) + \ldots \quad (2)$$

where:
  K' is the first derivative of K.

Inserting this expanded expression in equation (1) gives:

$$K(x-x_0)\int_{x_1}^{x_2} P(x')dx' + \quad (3)$$

$$K'(x-x_0)\int_{x_1}^{x_2}(x_0-x')P(x')dx' - \ldots$$

The second term in equation 3 can be eliminated by choosing $x_0$ as follows:

$$x_0 \int_{x_1}^{x_2} P(x')x'dx' / \int_{x_1}^{x_2} P(x')dx' \quad (4)$$

Equation 4 is the equation for finding the location of the center of mass of the peripheral region 51. To a first order approximation, therefore, the only term in equation (3) which contributes to the convolution process is as follows:

$$K(x-x_0)\int_{x_1}^{x_2} P(x')dx' \quad (5)$$

Figure 8C:
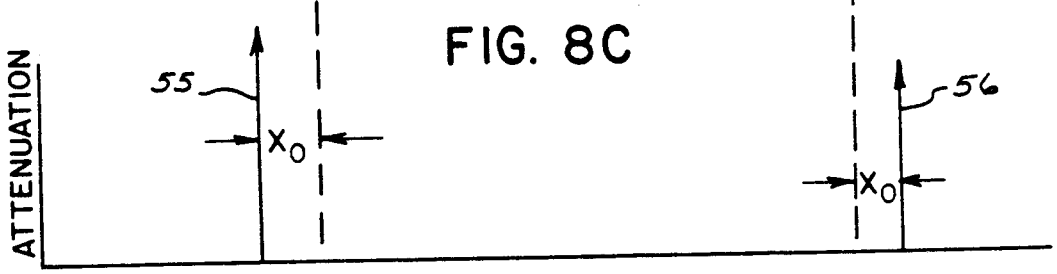
Figure 8D:
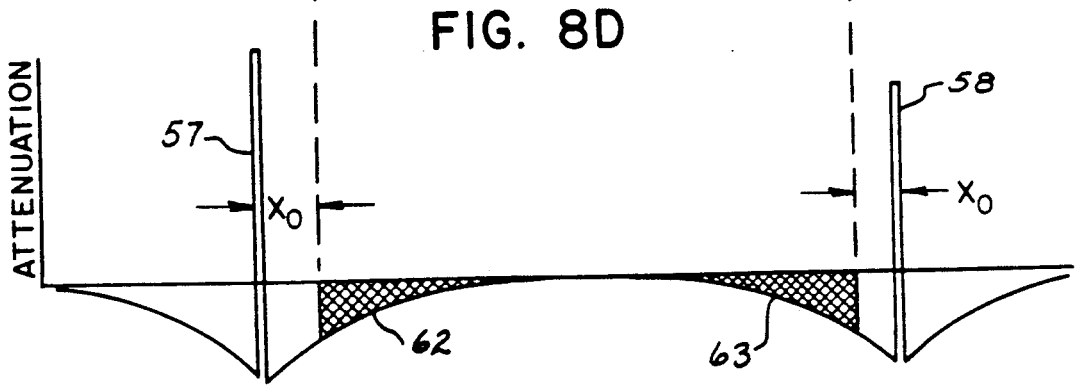

This term is the integral of all the attenuation values in the peripheral region 51 multiplied by the convolution kernel positioned at the center of mass of the peripheral region 51. The entire set of 53 attenuation values in each of the peripheral regions 51 and 52 can be replaced, therefore, with a single value at the region's center of mass. This is indicated at FIG. 8C by the respective arrows 55 and 56 which represent single attenuation values equal to the sum of all the attenuation values in their respective peripheral regions 51 and 52.

Referring again to FIG. 9, the convolution program carries out this process by calculating the integral of each peripheral region 51 and 52 by adding up all of the attenuation values therein, as indicated at process block 57. Then, as indicated by process block 58, the center of mass of each peripheral region 51 and 52 is calculated as set forth above in equation (4). The convolution kernel 35 is then multiplied by the integral value of region 51 as indicated at process block 59 to provide the first order approximation of the convolution of peripheral region 51. The same function is performed for peripheral region 52. As indicated by process block 60, these convoluted peripheral regions are located with respect to the convoluted central region 51 by indexing away from their centers by an amount equal to the center of mass $x_0$. This is shown pictorially in FIG. 8D where the center impulse 57 of the convoluted peripheral region 51 is located a distance $x_0$ to the left of the central region, and the central impulse 58 of convoluted peripheral region 52 is located to the right of the central region.

Those portions of each convoluted peripheral regions 51 and 52 which overlap the central region 50 are then added to the convoluted central region data 54 stored in the processed data array 36. This function is performed at process block 61 and is shown pictorially in FIG. 8D by the cross-hatched regions 62 and 63. In practice, of course, the convoluted peripheral region data is stored in a one-dimensional array and the program indexes by an amount $x_0$ from the center value. The remaining values in this array are then added to the respective values in the processed data array 36 starting at the left boundary of the central region. The same process is then repeated for the right side to compensate the image data for the effects of objects lying in both peripheral regions.

As indicated by decision block 65, the convolution program loops back to process each of the transmission profiles in the raw data array 33 and to thereby create the complete processed data array 36. The processed data array is then used to reconstruct an image in the conventional manner using the back projection technique.

The present invention enables the CT system to acquire data over a wide field of view which includes all objects that might otherwise distort the reconstructed image. The field of view of the reconstructed image is smaller, but the image data is compensated to account for the effects of objects in the wider, acquired field of view. This compensation is accomplished without a disproportionate increase in processing time caused by the crossing of a power-of-two boundary with the Fourier transformation steps.

We claim:

1. A method for producing an image with a CT system, the steps comprising:
    acquiring a set of transmission profiles, each transmission profile containing a set of attenuation values in a central region which corresponds to the field of view of the image to be reconstructed, and sets of attenuation values located in peripheral regions to each side of the central region;
    convoluting the central region of each transmission profile in the acquired set of transmission profiles with a convolution kernel to produce processed data;
    estimating the convolution of the sets of attenuation values in the peripheral regions of the transmission profiles by multiplying the convolution kernel by a single attenuation value which is the sum of the attenuation values in each peripheral region;
    compensating the processed data by adding the peripheral region estimates to the processed data to produce compensated processed data; and
    reconstructing an image by back projecting the compensated processed data.

2. The method as recited in claim 1 in which the convolution of each set of attenuation values in a peripheral region is estimated by multiplying the convolution kernel by a single attenuation value which is located at the center of mass of the peripheral region and which has an amplitude equal to the sum of all the attenuation values in the peripheral region.

3. The method as recited in claim 2 in which the estimated convolution of attenuation values in each peripheral region is an array of estimated attenuation values and selected ones of these estimated attenuation values are added to elements of the processed data.

* * * * *